(12) United States Patent
Deng

(10) Patent No.: US 10,291,280 B1
(45) Date of Patent: May 14, 2019

(54) MULTIFUNCTIONAL MOBILE TERMINAL PROTECTIVE CASING

(71) Applicant: Shenzhen Fengxian Investment Development Co.,Ltd., Shenzhen (CN)

(72) Inventor: Xiuhong Deng, Shenzhen (CN)

(*) Notice: Subject to any disclaimer, the term of this patent is extended or adjusted under 35 U.S.C. 154(b) by 0 days.

(21) Appl. No.: 15/967,629

(22) Filed: May 1, 2018

(51) Int. Cl.
| | |
|---|---|
| *H04B 1/38* | (2015.01) |
| *H04M 1/02* | (2006.01) |
| *H04B 1/3888* | (2015.01) |
| *H04W 84/12* | (2009.01) |

(52) U.S. Cl.
CPC ........ *H04B 1/3888* (2013.01); *H04M 1/0202* (2013.01); *H04B 2001/3894* (2013.01)

(58) Field of Classification Search
CPC ....... H04B 1/3888; H04B 1/40; H04W 84/12; H04W 36/14; H04W 4/025; H04W 88/08; H04W 76/10
See application file for complete search history.

(56) References Cited

U.S. PATENT DOCUMENTS

| | | | | |
|---|---|---|---|---|
| 2014/0268519 A1* | 9/2014 | Huang | ................ | H04B 1/3888 361/679.01 |
| 2014/0341197 A1* | 11/2014 | Hong | ................... | H04W 88/02 370/338 |
| 2017/0258191 A1* | 9/2017 | Poon | ...................... | A45C 11/00 |

* cited by examiner

*Primary Examiner* — Diane D Mizrahi
(74) *Attorney, Agent, or Firm* — W&K IP

(57) ABSTRACT

The present disclosure discloses a multifunctional mobile terminal protective casing, including a rear cover, a middle frame fitted with the edge of the rear cover, and a front cover clamped with a side of the middle frame departed from the rear cover; the rear cover, the middle frame and the front cover form a receiving chamber for receiving a mobile terminal; The present disclosure is comprehensively resistant to breakage, waterproof and dustproof.

6 Claims, 4 Drawing Sheets

MULTIFUNCTIONAL MOBILE TERMINAL PROTECTIVE CASING

TECHNICAL FIELD

The present disclosure relates to the field of protective casing for mobile terminals, and more particularly relates to a multifunctional mobile terminal protective casing.

BACKGROUND

Modern people cannot do almost anything without mobile terminals, and particularly some busy people need to use mobile terminals to work during swimming and taking shower and in heavy rains and water. As is known to all that the mobile terminals are not allowed to be entered by water and be in contact with water, so that it is inconvenient for people to carry and use the mobile terminals in such cases.

After all, people will work in these cases for little time, so that it is impossible for everyone to buy a waterproof mobile terminal to meet such a small requirement, and it is also impossible to buy a mobile terminal protective casing which is complicated in operation and relatively high in cost to meet this small requirement; and therefore, people only have to put up with such inconvenience at the cost of temporarily not using the mobile terminals.

Therefore, the prior art still needs to be improved and upgraded.

SUMMARY OF THE INVENTION

In view of the shortcomings in the prior art, the present disclosure aims at providing a multifunctional mobile terminal protective casing, and aims to solve the problem of low waterproof property of a mobile terminal protective casing in the prior art.

To achieve the foregoing objective, the present disclosure adopts the following technical solution:

a multifunctional mobile terminal protective casing, including:

a rear cover, a middle frame fitted with the edge of the rear cover, and a front cover clamped with the middle frame at the side departed from the rear cover.

The rear cover, the middle frame and the front cover form a receiving chamber for receiving a mobile terminal.

The rear cover includes a transparent polycarbonate (PC) plate, and a rear cover clamping part arranged around the transparent PC plate.

The front cover comprises a transparent plate for observing a screen of the mobile terminal, and a front cover clamping part arranged around the transparent plate.

A first clamping slot is formed in the middle part of the inner surface of the rear cover clamping part.

A plurality of first clamping bulges are arranged at the middle part of the inner surface of the middle frame.

A plurality of second clamping slots matched with the first clamping bulges are formed in the front cover clamping part at the side facing to the middle frame; and a plurality of second clamping bulges matched with the first clamping slot are arranged on the front cover clamping part at the side facing to the rear cover clamping part.

Preferably, in the multifunctional mobile terminal protective casing, an upper rope hanging hole is formed in the right side of the top of the middle frame.

Preferably, in the multifunctional mobile terminal protective casing, a lower rope hanging hole is formed in the left side of the bottom of the middle frame.

Preferably, in the multifunctional mobile terminal protective casing, a plurality of soft rubber buttons are arranged on the right side of the middle frame.

Preferably, in the multifunctional mobile terminal protective casing, a Universal Serial Bus (USB) plug is arranged at the middle part of the bottom side of the middle frame.

Preferably, in the multifunctional mobile terminal protective casing, the middle frame is made of hard rubber, and the front cover clamping part is made of soft rubber.

Compared with the prior art, the multifunctional mobile terminal protective casing provided by the present disclosure includes the rear cover, a middle frame fitted with the edge of the rear cover, and a front cover clamped with the side, which is departed from the rear cover, of the middle frame; the rear cover, the middle frame and the front cover form the receiving chamber for receiving the mobile terminal, the rear cover includes the transparent PC plate, and the rear cover clamping part arranged around the transparent PC plate, the front cover includes the transparent plate for observing the screen of the mobile terminal, and the front cover clamping part arranged around the transparent plate, the first clamping slot is formed in the middle part of the inner surface of the rear cover clamping part, a plurality of first clamping bulges are arranged at the middle part of the inner surface of the middle frame, a plurality of second clamping slots matched with the first clamping bulges are formed in the side, which faces to the middle frame, of the front cover clamping part, and a plurality of second clamping bulges matched with the first clamping slot are arranged on the side, which faces to the rear cover clamping part, of the front cover clamping part, so that the multifunctional mobile terminal protective casing is comprehensively resistant to breakage; the rear cover presses the second clamping slots of the front cover to achieve waterproof and dustproof aims; and in addition, as no sealing ring is needed, a trouble that a sealing ring is retained in a disassembling process will not be caused, and the waterproof property is more reliable.

DETAILED DESCRIPTION OF THE EMBODIMENTS

To make objectives, technical solutions and effects of the present disclosure clearer and more explicit, a further detailed description will be made below to the present disclosure with reference to accompanying drawings and embodiments. It should be understood that the specific embodiments described herein are merely explanatory of the present disclosure, but not intended to limit the present disclosure.

Figure 1:
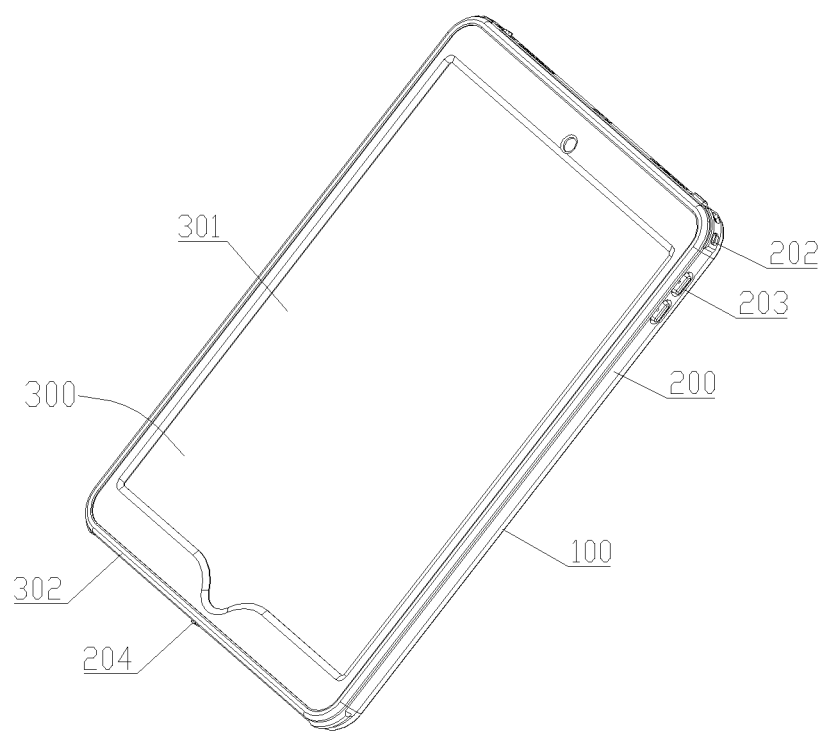
FIG. 1 is a stereostructure chart of a preferred embodiment of a multifunctional mobile terminal protective casing of the present disclosure.
Figure 2:
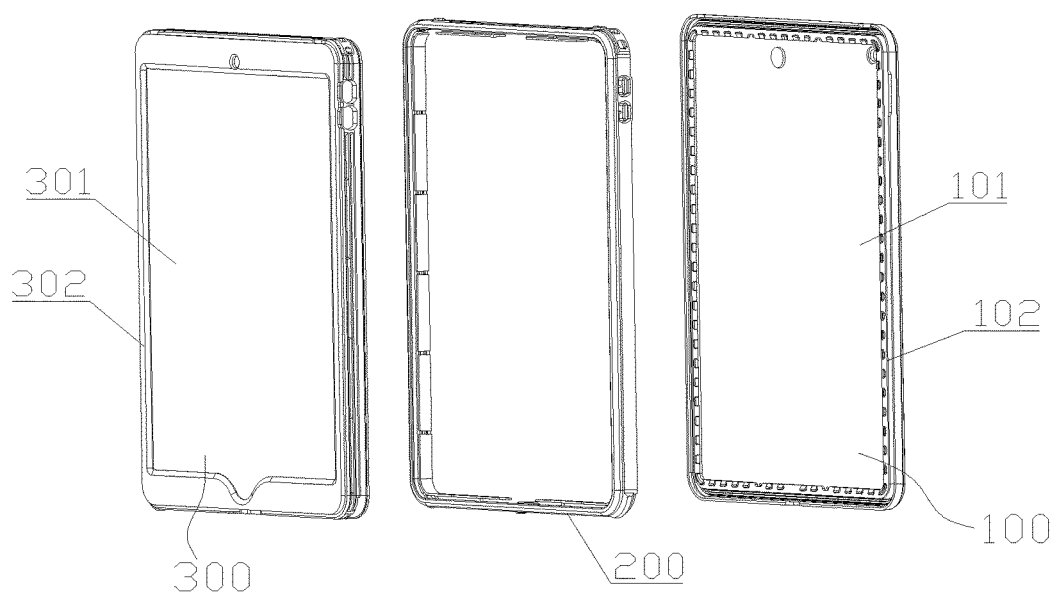
FIG. 2 is an exploded view of a preferred embodiment of a multifunctional mobile terminal protective casing of the present disclosure.
Figure 3:
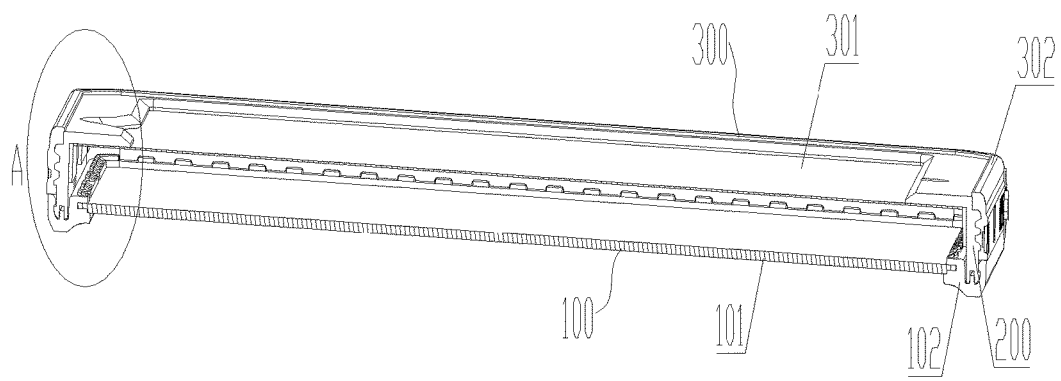
FIG. 3 is a section view of a preferred embodiment of a multifunctional mobile terminal protective casing of the present disclosure.
Figure 4:
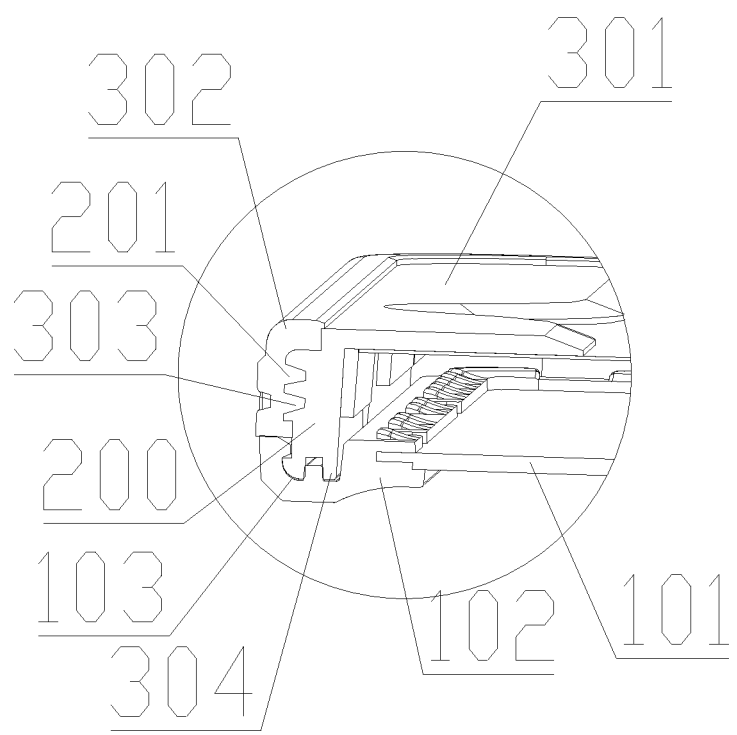
FIG. 4 is an enlarged view of a portion A in FIG. 3.

As shown in FIGS. 1 to 4, a multifunctional mobile terminal protective casing provided by the present disclosure includes a rear cover 100, a middle frame 200 fitted with the edge of the rear cover 100, and a front cover 300 clamped with the side, which is departed from the rear cover 100, of the middle frame 200; the rear cover 100, the middle frame 200 and the front cover 300 form a receiving chamber for receiving a mobile terminal; the rear cover 100 includes a transparent polycarbonate (PC) plate 101, and a rear cover clamping part 102 arranged around the transparent PC plate 101; the front cover 300 includes a transparent plate 301 for observing a screen of the mobile terminal, and a front cover clamping part 302 arranged around the transparent plate 301; a first clamping slot 103 is formed in the middle part of the inner surface of the rear cover clamping part 102; a plurality of first clamping bulges 201 are arranged at the middle part of the inner surface of the middle frame 200; a plurality of second clamping slots 303 matched with the first clamping bulges 201 are formed in the side, which faces to the middle frame 200, of the front cover clamping part 302; and a plurality of second clamping bulges 304 matched with the first clamping slot 103 are arranged on the side, which faces to the rear cover clamping part 102, of the front cover clamping part 302.

In specific implementation, the mobile terminal is contained in the receiving chamber, and is spaced from the transparent PC plate at a distance of 0.5 mm, thereby forming a large tone cavity inside, and the tone quality is higher.

In specific implementation, a camera hole is formed in a position, which corresponds to a camera of the mobile terminal, on the rear cover clamping part 102, and the camera hole is closely fitted with a camera lens.

In a further preferred embodiment of the present disclosure, an upper rope hanging hole 202 is formed in the right side of the top of the middle frame 200.

In a further preferred embodiment of the present disclosure, a lower rope hanging hole (not shown in the drawings) is formed in the left side of the bottom of the middle frame 200.

In specific implementation, by the two diagonal rope hanging holes, the multifunctional mobile terminal protective casing may be attached to the waist through a hanging rope in an outdoor exercise, and is convenient to carry.

In a further preferred embodiment of the present disclosure, a plurality of soft rubber keys 203 are arranged on the right side of the middle frame 200.

In specific implementation, the front cover 300 is adhered with a transparent sheet which neither affects a watching and display region, nor affects a touch feeling; the front cover 300 also has hard rubber and soft rubber sleeves, so that the protective casing is firmer; by soft rubber, a touch feeling of pressing the keys has no difference with that of pressing real keys; and the soft rubber is distributed outside and inside the protective casing, so that the protective casing is comprehensively resistant to breakage.

In a further preferred embodiment of the present disclosure, a USB plug 204 is arranged at the middle part of the bottom side of the middle frame 200.

In a further preferred embodiment of the present disclosure, the middle frame 200 is made of hard rubber, and the front cover clamping part 302 is made of soft rubber.

As the middle frame 200 is made of a hard rubber material, the rear cover clamping part 102 elastically wraps the middle frame 200; furthermore, the second clamping bulges 304 of the front cover clamping part 302 are clamped in the first clamping slot 103, and the first clamping bulges 201 are clamped into the second clamping slots 303, so that a plurality of waterproof surfaces are formed via fitting, and the waterproof and dustproof properties are greatly improved; and in addition, as no sealing ring is needed, a trouble that a sealing ring is retained in a disassembling process will not be caused, and the waterproof property is more reliable.

Above all, the present disclosure discloses the multifunctional mobile terminal protective casing, including a rear cover, a middle frame fitted with the edge of the rear cover, and a front cover clamped with the side, which is departed from the rear cover, of the middle frame; the rear cover, the middle frame and the front cover form the receiving chamber for receiving the mobile terminal; the rear cover includes the transparent PC plate, and the rear cover clamping part arranged around the transparent PC plate; the front cover includes the transparent plate for observing the screen of the mobile terminal, and the front cover clamping part arranged around the transparent plate; the first clamping slot is formed in the middle part of the inner surface of the rear cover clamping part, a plurality of first clamping bulges are arranged at the middle part of the inner surface of the middle frame, a plurality of second clamping slots matched with the first clamping bulges are formed in the side, which faces to the middle frame, of the front cover clamping part, and the plurality of second clamping bulges matched with the first clamping slot are arranged on the side, which faces to the rear cover clamping part, of the front cover clamping part, so that the multifunctional mobile terminal protective casing is comprehensively resistant to breakage; the rear cover presses the second clamping slots of the front cover to achieve waterproof and dustproof aims; and in addition, as no sealing ring is needed, the trouble that the sealing ring is retained in the disassembling process will not be caused, and the waterproof property is more reliable.

It can be understood that an ordinary person skilled in the art can make equivalent replacements or changes that shall all fall within the scope of protection of attached claims of the present disclosure on the basis of the technical solutions and concepts of the present disclosure.

I claim:

1. A multifunctional mobile terminal protective casing, comprising:
   a rear cover, a middle frame fitted with the edge of the rear cover, and a front cover clamped with the middle frame at a side departed from the rear cover;
   wherein the rear cover, the middle frame and the front cover form a receiving chamber for receiving a mobile terminal;
   wherein the rear cover comprises a transparent Polycarbonate plate, and a rear cover clamping part arranged around the transparent Polycarbonate plate;
   the front cover comprises a transparent plate for observing a screen of the mobile terminal, and a front cover clamping part arranged around the transparent plate;
   a first clamping slot is formed in the middle part of an inner surface of the rear cover clamping part; a plurality of first clamping bulges are arranged at the middle part of an inner surface of the middle frame; a plurality of second clamping slots matched with the first clamping bulges are formed on the front cover clamping part at a side facing to the middle frame; and a plurality of second clamping bulges matched with the first clamping slot are arranged on the front cover clamping part at a side facing to the rear cover clamping part.

2. The multifunctional mobile terminal protective casing according to claim 1, wherein an upper rope hanging hole is formed in the right side of the top of the middle frame.

3. The multifunctional mobile terminal protective casing according to claim 2, wherein a lower rope hanging hole is formed in the left side of the bottom of the middle frame.

4. The multifunctional mobile terminal protective casing according to claim 1, wherein a plurality of soft rubber buttons are arranged on the right side of the middle frame.

5. The multifunctional mobile terminal protective casing according to claim 4, wherein a Universal Serial Bus plug is arranged at the middle part of the bottom side of the middle frame.

6. The multifunctional mobile terminal protective casing according to claim 1, wherein the middle frame is made of hard rubber, and the front cover clamping part is made of soft rubber.

* * * * *